United States Patent [19]

Bue et al.

[11] Patent Number: 4,682,292

[45] Date of Patent: Jul. 21, 1987

[54] FAULT TOLERANT FLIGHT DATA RECORDER

[75] Inventors: Richard L. Bue, West Hartford; Ratchford Michael, East Granby, both of Conn.

[73] Assignee: United Technologies Corporation, Hartford, Conn.

[21] Appl. No.: 633,730

[22] Filed: Jul. 23, 1984

[51] Int. Cl.[4] .............................................. G11B 5/02

[52] U.S. Cl. ...................................... 364/424; 360/5; 369/21

[58] Field of Search ................. 364/424, 900; 371/66; 365/228; 360/5, 31; 369/21

[56] References Cited

U.S. PATENT DOCUMENTS

| | | | |
|---|---|---|---|
| 4,409,670 | 10/1983 | Herndon et al. | 360/5 |
| 4,433,395 | 2/1984 | Iyehara et al. | 371/66 |
| 4,470,116 | 9/1984 | Ratchford | 364/424 |
| 4,493,083 | 1/1985 | Kinoshita | 365/228 |

*Primary Examiner*—Gary Chin

*Attorney, Agent, or Firm*—Dominic J. Chiantera

[57] ABSTRACT

Signal units of information stored in electronic memory are arranged in frames which are separated in memory by configurable end of data pointers, each frame stored with a first configuration pointer indicating a present frame, the storing of each present frame changing the preceding frame pointer to a second configuration, whereby loss of frame data due to power interruption during storage is limited to the identifiable present frame.

5 Claims, 7 Drawing Figures

FAULT TOLERANT FLIGHT DATA RECORDER

TECHNICAL FIELD

This invention relates to electronic signal memory storage devices, and more particularly to improved methods of storing signals therein.

BACKGROUND ART

As known, solid state signal memory devices provide interim storage of electronic signal data, e.g. digital signal data. The signals are stored within the memory at various address locations which are identified to allow later data retrieval. In volatile memories, the stored information is preserved only in the presence of applied electrical power. The memory contents are lost in the absence of power. Alternatively, nonvolatile memories maintain the stored signal characters even in the absence of applied power; at least for a specified duration.

Alterable nonvolatile memories, i.e. those in which new data may be written over old data, have been used extensively in avionic, digital flight data recording systems (DFDRS) for storing protected flight parameter data. Typical of the DFDRS nonvolatile memories are the electrically alterable read only memory (EAROM) and the electrically erasable programmable read only memory (EEPROM) devices. Both allow stored data to be written over in situ and both preserve the stored data throughout power interruptions. The data writing process involves the sequence of first erasing the entire former data unit (e.g. word, byte or nibble) and then entering the new data at the same address. Erasing is required due to the physical properties of the materials involved and the memory's designed operating system.

For DFDRS systems which are used for post-accident (incident) analysis the memory unit must be crash survivable. This is accomplished by having the memory encased in an armored housing which results in accelerated operating temperatures on the order of 125° C. As a result the DFDRS memory devices are write cycle limited in the number of data writing entries which may be made at any one address location. Exceeding this limit may result in a "burnout" of that location, which results in a loss in the memory's abiity to store the information intact throughout a power interruption. Device manufacturers specify a maximum number of write cycles, on the order of $10^4$, which establishes the upper limit over which the statistical probability of failure of the memory device is defined.

Another performance limitation imposed by the severe DFDRS operating environment is that the memories have long write time cycles. It takes a longer time to write data into memory. System power loss during a write-in is common. Each power loss during write-in results in loss of the frame of data which was in the process of being written in when the power interruption occurred, together with loss of signal frame synchronization. This causes the system to search for the last recognized synch pattern, which may further result in discarding one or more additional frames of stored data before synchronization is again established. The result is a non-recoverable gap in the real time data recording sequence for the stored parameter time history.

DISCLOSURE OF INVENTION

The object of the present invention is to provide an improved method of recording signal units of data in a crash survivable flight data recorder (CSFDR) nonvolatile solid state memory.

According to the present invention, the signal units of data are arranged serially, in successive frames, each frame separated from preceding and succeeding frames by end of data (EOD) pointers comprising a signal unit having all signal bits in a common logic state, each frame storage location is mapped from the address of the EOD pointer of the preceding frame to the EOD pointer for the present frame, and the frame is written into the mapped memory location in reverse order, with the frame's last signal unit being stored adjacent the present frame EOD pointer and the frame's first signal unit being stored in place of the EOD pointer of the preceding frame, whereby, following the occurrence of a power interruption, frame synchronization is re-established with the earliest stored frame having the highest number of EOD pointers.

In further accord with the present invention, the signal units of each frame are read following storage of the entire frame to detect memory address failure, each failed address is tabulated, the frame map extended by the number of detected failed addresses, and the frame is rewritten in memory.

In still further accord with the present invention, each stored frame includes error checking code signal units, such as a cyclic redundancy check (CRC) code, which is compared against the frame data during retreival from memory to determine signal data integrity, and in the event of data error the frame is discarded.

The improved signal storage methods of the present invention are all related to improving stored data integrity. The manner mapping the frame data into memory with EOD pointers limits the amount of data lost due to power interruption. Typically the signal units are byte length. By using a double byte EOD pointer which is altered to a single byte marker following entry of a present frame, the loss of data due to power interrupt is limited to one frame instead of the several frames lost with prior art techniques.

Similarly, the reading of each frame following write-in allows for an immediate detection of a faulty address cell or location region. Each detected faulty address location is identified in a memory table which is consulted during the mapping process of each frame to ensur that the faulted location is no longer mapped. Finally, the use of an error checking code insures that stored data did not deteriorate while in memory due to long term memory fade out. All three techniques insure data integrity and the reliability of the information retrieved.

These and other objects, features and advantages of the present invention will become more apparent in light of the following detailed description of a best mode embodiment thereof, as illustrated in the accompanying drawing.

BEST MODE FOR CARRYING OUT THE INVENTION

Figure 2:
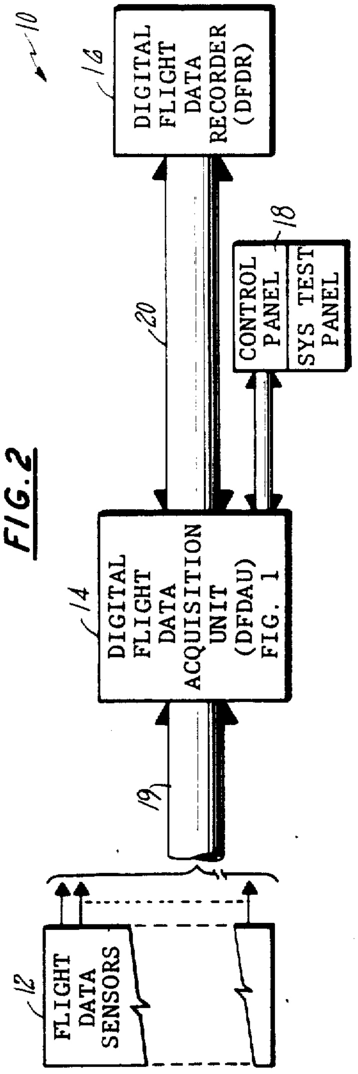
FIG. 2 is a simplified block diagram illustration of the DFDRS of FIG. 1.

FIG. 2 is a simplified block diagram of a digital flight data recording system (DFDRS) 10, in which the present invention may be used. The DFDRS receives sensed flight parameter information from flight data sensors 12. The signals are conditioned and compressed in a digital flight data acquisition unit (DFDAU) 14, and selected ones of the compressed parameter signals are recorded in a crash survivable digital flight data recorder (DFDR) 16. A cockpit mounted control system/test panel 18 provides operator interface to the system.

The flight data sensors 12 provide analog, discrete, and digital input signals through lines 19 to the DFDAU. The DFDAU conditions the input signal data; converting each to a digital signal format compatible with the DFDRS. The "bulk data" conditioned signals are then compressed into series sample frames, including fixed frames occuring at a fixed repetition interval (typically 60 seconds), and variable frames which are recorded intermediate to the fixed frames in response to one or more sensed parameters exceeding a tolerance (aperture) value since the last fixed frame.

Figure 3A:
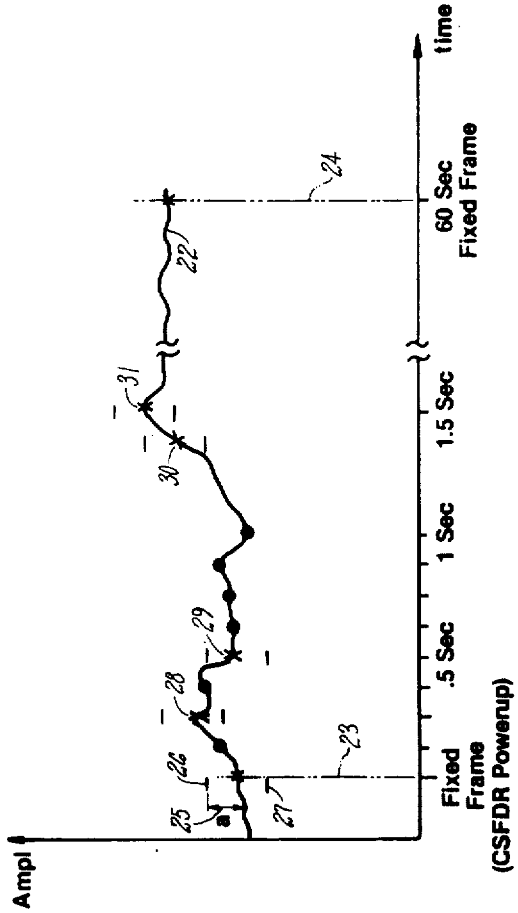
FIG. 3A is an illustration of a real time data waveform, as used in the description of the present invention.

FIG. 3A illustrates the operation of the DFDAU in compressing the sensed data. An exemplary parameter real time waveform 22 has its sample values recorded (as evidenced by X symbol) in fixed frames 23, 24; shown to occur at 60 second intervals. The parameter samples between fixed frames are not recorded unless the sampled parameter value exceeds a tolerance, i.e. aperture value (a) 25 established around the last fixed frame sample. The aperture value has an upper limit 26 and lower limit 27. If the sampled value does exceed the aperture it is recorded in the variable frame intermediate to the fixed frames. Each variable frame includes all parameter exceedances (outside the aperture limit) occurring in a subinterval, e.g. one second interval. As shown in FIG. 3, samples 28, 29 are out of limit and are recorded in a variable frame. Similarly, samples 30, 31 exceed the aperture value and are recorded in a second variable frame.

Figure 3B:
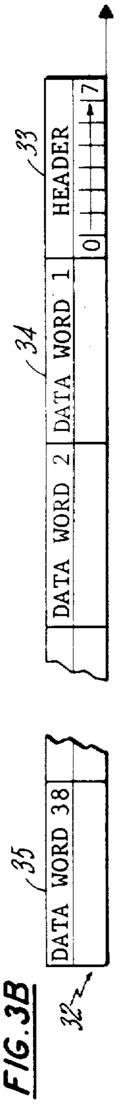
FIG. 3B is an illustration of one signal data format, as used in the description of the present invention.
Figure 3C:
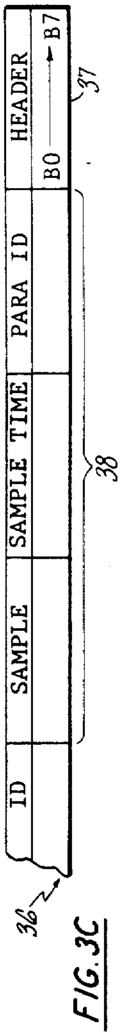
FIG. 3C is an illustration of another signal data format, as used in the description of the present invention.

FIG. 3B illustrates the fixed frame format 32. The frame includes a plurality of different parameter sample values (e.g. "Data Words", each one signal unit long. Typically the signal unit is a byte (eight bit) sample, however larger or smaller signal units may be used. In the present embodiment the fixed frame includes thirty-nine signal units, i.e. bytes, of data. The first byte 33 is a header in which seven bits (B0–B6) define the samples real time, and the eighth bit (B7) identifies the frame as fixed (1) or variable (0). The second through thirty-nine bytes 34–35 are thirty-eight data words. FIG. 3C illustrates the variable frame 36, which has a variable number of signal units, depending on the number of aperture exceeding data samples. The variable frame includes a header 37 and three bytes 38 for each data sample entry, identifying: the parameter, the time since the beginning of the variable frame, and the parameter value.

Figure 1:
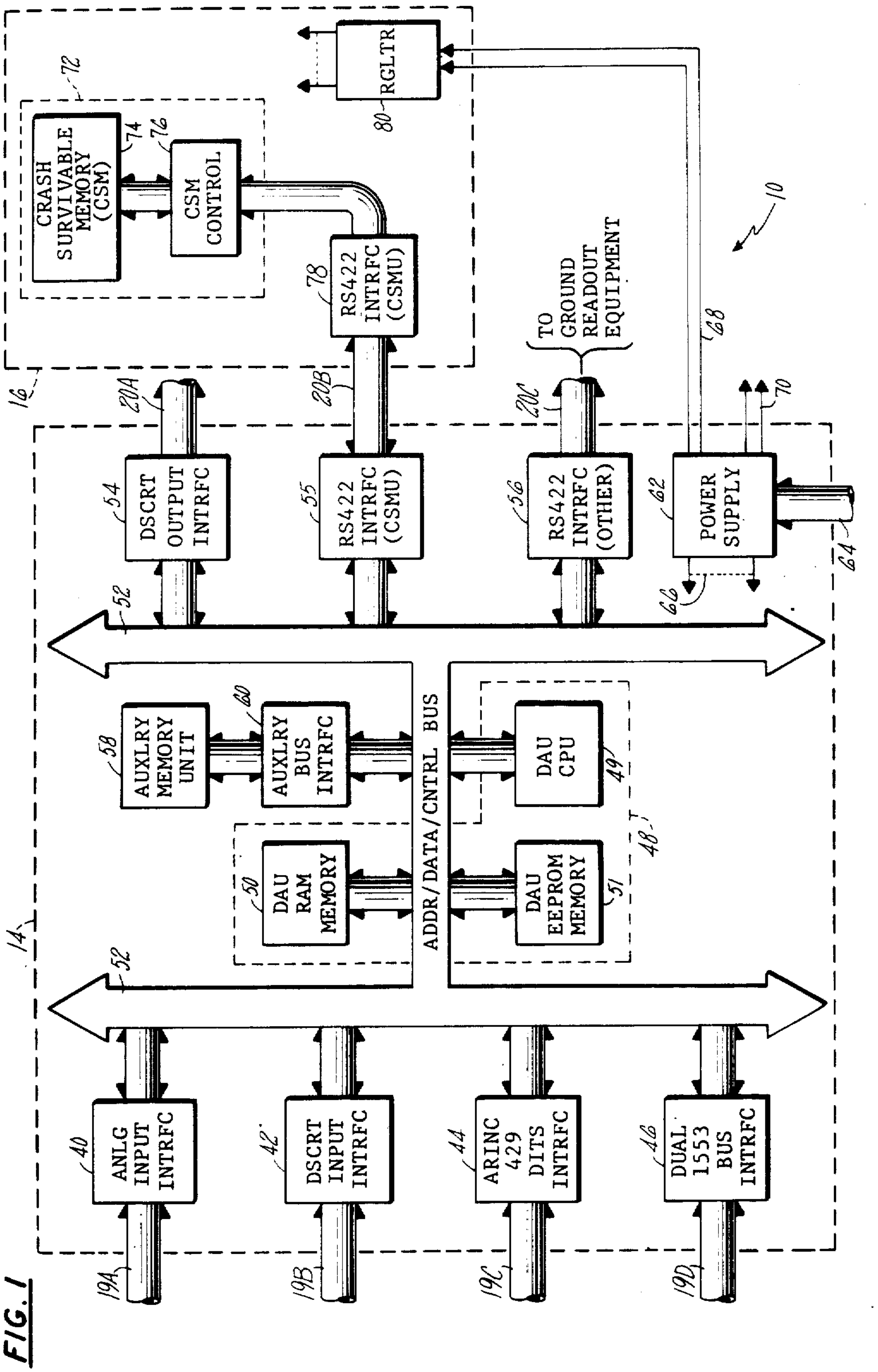
FIG. 1 is a system block diagram illustration of a digital flight data recording system (DFDRS) in which the present invention may be used.

Referring now to FIG. 1, in a detailed system block diagram of the DFDRS 10, the sensor and avionic bus input signals are presented through the lines 19A–19D to different signal-type interfaces within the DFDAU 14. Typically the interfaces include an analog input interface 40, a discrete signal input interface 42, and ARINC 429 digital information transfer system (DITS) input interface 44 and/or a dual MIL-STD-1553 bus interface 46. The bus interface allows the DFDAU to receive data which is already available on the 1553 avionics bus.

Each interface converts the input data into a digital format compatible with the DFDAU signal processor 48. The signal processor includes a known type CPU 49, such as a ZILOG Model Z8002 microprocessor, and local RAM and ROM memories 50, 51. The ROM may be nonvolatile program store memory, such as EEPROM. The signal processor 48 accesses each of the interface conditioner output signals via the system ADDRESS/DATA/CONTROL BUS 52 using software techniques and methods known to those skilled in the art of software programming. Each interface stores the output signal information in a direct memory access (DMA) within the interface for retrieval by the processor.

The DFDAU output interfaces include: a discrete signal output interface 54, and communication interfaces 55, 56. The communications interfaces 55, 56, as described in detail hereinafter, are serial RS-422 communication interfaces with differential data transmission, and the frame signal format described in FIG. 3. The serial interface 55 provides DFDAU to DFDR communications through lines 20B and the interface 56 communicates through lines 20C with other utilization circuitry and optional DFDARS control panel 18 (FIG. 2).

The DFDAU includes supplemental memory storage in an auxiliary memory unit (AMU) 58 connected to the system bus 52 through an auxiliary bus interface 60. The AMU is nonvolatile, and provides storage for sensed flight data parameters which need not be recorded in the crash survivable memory within the DFDR 16. The DFDR provides storage of mandatory recording parameters in a crash survivable memory unit (CSMU) 72. The CSMU is an armored housing which protects an internal crash survivable memory (CSM) 74 and CSM control 76 from penetration during crash. The DFDR communicates with the DFDAU communication interface 55 through its complementary RS-422 interface 78 which, with a DFDR voltage regulator 80, is located outside the CSMU.

The DFDR read/write operation is controlled by CSM control 76 which includes a known type CPU, such as the INTEL Model 8051 microprocesor. The control determines where DAU framed signal data is to be stored in the CSM. It is responsible for protecting data associated with special events, i.e. "protected data", by preventing the protected data from being overwritten with more recent data prior to read-out by the ground readout equipment (GRE). When a DAU command is received to store data the control writes a frame of data to the appropriate CSM location, together with a frame address. The frames typically are written once per second. If the data is protected the control writes START and END addresses for each protected block into a protected data memory map. The protected blocks will not be overwritten until a command to overwrite is received from the DAU.

The present invention relates to the method by which the CSM control 76 stores the frame data from the DFDAU 14 in the CSM 74. The method of storing the data includes different aspects, each related to improving the integrity of data storage. While data integrity is critical to the DFDRS application where post accident reconstruction requires reliable data to make a resolute reconstructed parameter(s) waveform(s), it should be understood that the present invention methods may be used in any application in which data is stored in electronic memory. Therefore, its utility is not limited to nonvolatile crash survivable memory applications, but may also be used with nonvolatile memory storage.

Figure 4:
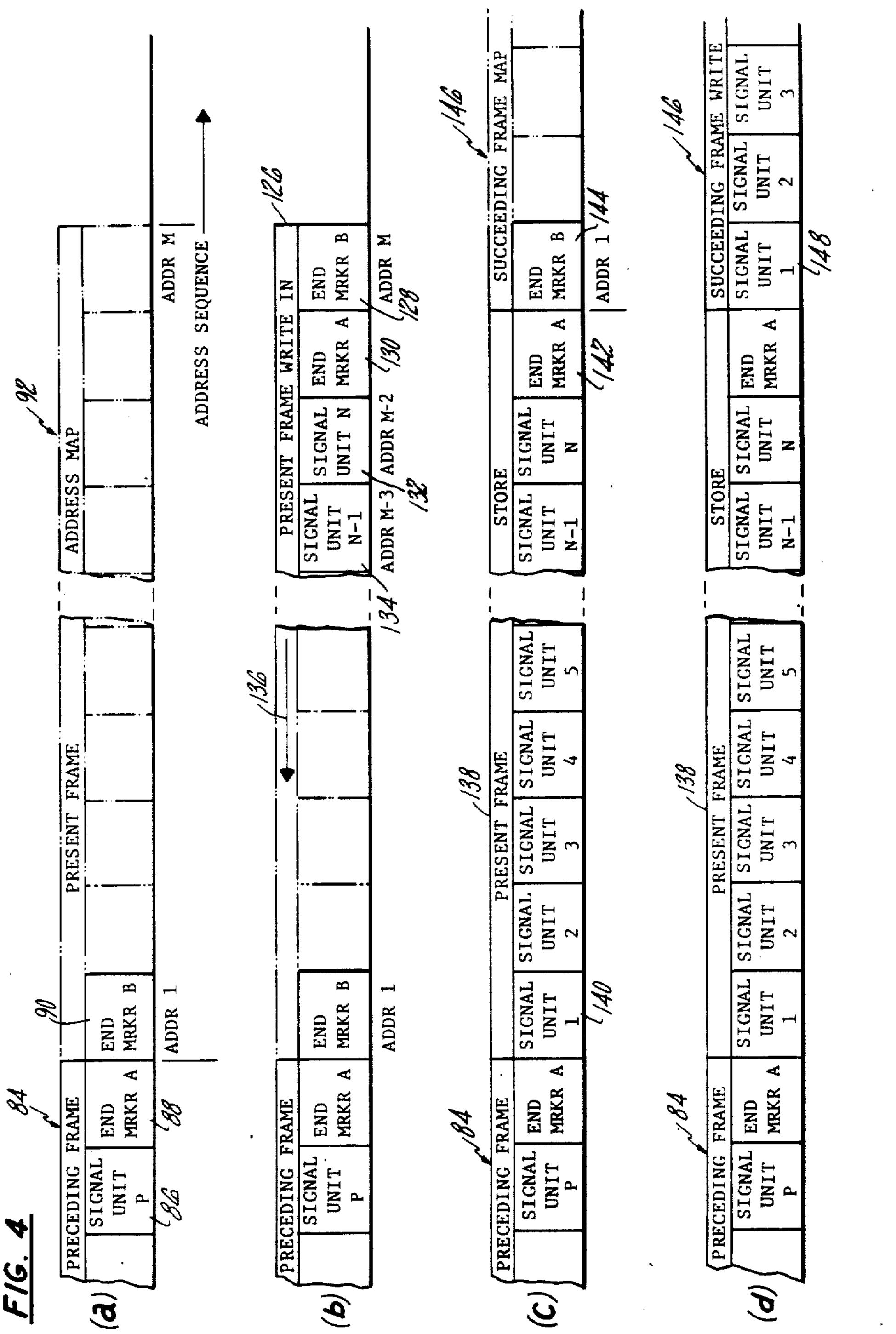
FIG. 4 is a simplified illustration for use as a visual aid in describing the operation of the present invention.

According to a first aspect, the data frames are stored in sequential address locations separated by end of data (EOD) pointers, i.e. "markers" to differentiate the data content of the frames. FIG. 4 is a visual aid illustrating the sequence of storing data in memory. Illustration (a) is a spatial illustration of a portion of the address distribution of the memory in which data is to be stored. A preceding frame of stored data 84 includes P number of signal units; signal unit 86 being the last data unit followed by two EOD markers 88, 90. The next data frame to be stored, i.e. the present frame, is address mapped 92 into successive address locations in memory, beginning with the second EOD marker 90, i.e. "END MRKR B" at address (ADDR) 1; through ADDR M. The actual number of address locations is dependent on the number of signal units in the present frame. In the DFDRS application of FIG. 1, having both fixed and variable frame formats, the fixed frame has a fixed number of signal units. Similarly, the total number of signal units in each variable frame is known prior to storage in memory. The total number of map locations equals the sum of the signal units in the frame plus the two EOD markers.

Figure 5:
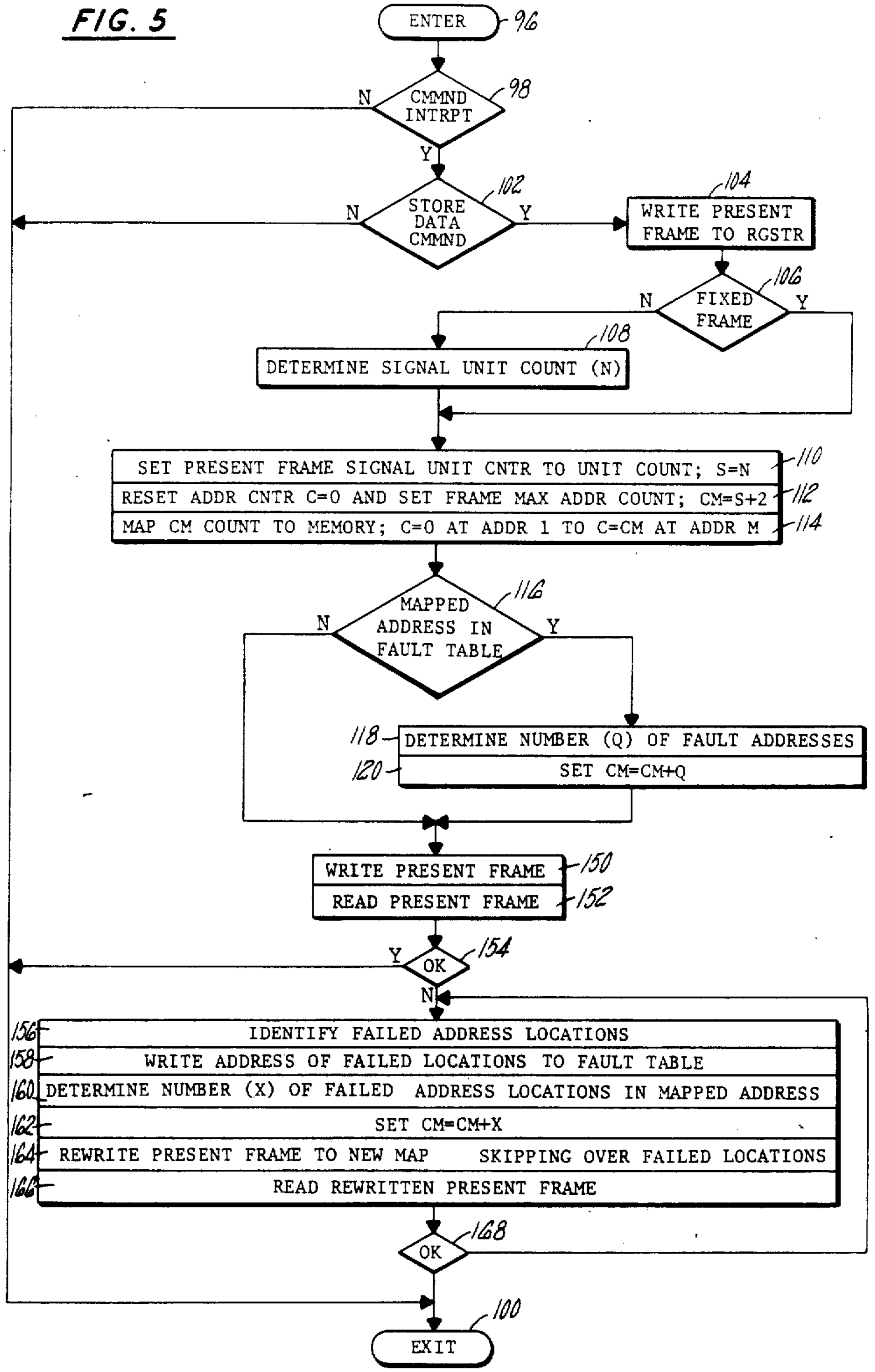
FIG. 5 is a flowchart diagram illustrating the operation of the present invention as used in the system embodiment of FIG. 1.

FIG. 5 is a flowchart diagram illustrating the steps performed by the CSM control 76 in storing a present data frame in memory. In FIG. 5A, the CSM control enters the flowchart at 96 and decision 98 determines if there is a command interrupt from the DAU signal processor 48. If NO, the CSM processor exits at 100 (FIG. 5B). If YES, decision 102 determines if the command is a "store data" command; if NO, the processor exits at 100 and if YES, instructions 104 write the present data frame into CSM control register. As described hereinafter, the CSM control reads each data stored frame after write-in to determine if each signal unit has been recorded. This requires that the data frame remain intact in register until the CSM control determines that the data is stored in memory.

Following instructions 104, decision 106 determines if the present frame is a fixed frame. If NO, instructions 108 determine the number of signal units in the present variable frame. The number of signal units is known by a signal unit count included in the frame transmission. Following instructions 108, or a YES to decision 106, instructions 110 set a SIGNAL UNIT COUNTER to the signal unit count value determined in 108, i.e. $S=N$. Instructions 112 reset the CSM control address counter to zero ($C=0$) and set the present frame max address count ($C_M$) to the signal unit count plus two, i.e. $C_M=S+2$.

The CSM control processor determines where the frame data received from the DFDAU is to be stored in the CSM. Instructions 114 require the CSM processor to map the max address count $C_M$ into memory. The map for a present frame begins at a first address location (ADDR 1) associated with the address count $C=0$ through a last address location (ADDR M) occurring at the max address count $C=C_M$. As shown in FIG. 4, illustration (a), the beginning address for the present frame (ADDR 1) is coincident with the EOD pointer "END MRKR B" 90 of the preceding frame 84. The second of the two EOD pointers, or markers of the preceding frame is a designated address location for storing a signal unit of the present frame. As described hereinafter, the second end marker of the preceding frame is overwritten by the last data entry of the present frame. Until this last signal unit entry of the present frame the second marker remains intact, so that the actual overwriting of this marker is a "flag" indication that a present frame has been stored.. Once overwritten the preceding frame is characterized by only a single marker, e.g. END MRKR A88. In the event of a power interruption during present frame storage, the present frame is not completed, and the second marker of the preceding frame is never overwritten.

Following the mapping of the present frame address locations, decision 116 determines if any of the addresses in the memory map is listed in a fault table listing of defective addresses, which is stored in another portion of memory. These defective addresses, as described hereinafter, are detected by the inability of the CSM processor to read the data content of a signal unit after write-in. The failure of the address location is overcome by simply storing the signal unit in another location and listing the effective address in the table. By keeping track of all defective locations the processor avoids the trouble of having to rediscover the defective address location on the next write over of the same address. If the answer to the decision 116 is YES, instructions 118 determine the number of defective addresses (Q) and instructions 120 increase the present max address count by this number ($C_M=C_M+Q$).

With the address map complete the present frame EOD markers are first written into the last two address locations of the map, i.e. ADDR M and ADDR M-1 (128, 130 of FIG. 4, illustration (b)). The M number of signal units of the frame are then written in reverse order into the map, beginning with signal unit N which is written into ADDR M-2 (132) adjacent the END MRKR A, followed by signal unit N-1 at ADDR M-3 (134), and so on, in the direction of the arrow 136. FIG. 4, illustration (c) shows the stored present frame 138 with all signal units written into the address locations. Signal unit 1 is written into ADDR 1 (140). The result is that the preceding frame 84, and all prior stored frames, are characterized by a single EOD pointer "END MRKR A". Only the most recently stored frame, i.e. the present frame 138 has two end of data pointers "END MRKR A, B" (142, 144).

Illustration (c) also shows the lower portion of the memory map for the succeeding frame 146. The succeeding frame map includes the END MRKR B 144 as the ADDR 1 location of its map. Illustration (d) illustrates the sequence of storing the preceding frame 84, present frame 138, and the completed succeeding frame 146. The succeeding frame represents the most recent stored frame with its signal unit 1 data entry being written over the END MRKR B of the present frame 138.

Referring again to FIG. 5, the frame, including EOD pointers, is written into the memory map locations in instructions 150. Instructions 152 require the CSM control processor to read each of the signal unit entries of the present frame to detect any faulted address locations. Decision 154 determines if all of the present frame signal unit entries and EOD markers are stored. If YES, the CSM processor exits at 100. If any of the signal units, including the EOD pointers, cannot be read, the corresponding address locations are considered to be faulted. Instructions 156 identify the faulted address locations and instructions 158 write the faulted location addresses to the memory fault table.

The newly discovered failed address locations are replaced by the next succeeding available locations beyond the present frame map. The map is increased to accommodate the necessary new locations and the frame is rewritten skipping over the faulted locations listed in the table. Instructions 160 determine the number (X) of faulted locations discovered in instructions 156. Instructions 162 add the X number of new failed locations to the total map count by setting the count $C_M$ equal to $C_{M+X}$. Instructions 164 write the frame with EOD markers into the new modified map, skipping over the failed locations discovered in instructions 158 (which are listed in the fault table). Instructions 166 read the modified frame and decision 168 determines if all of the signal unit entries are readable. If NO, the CSM processor branches back to instructions 156 and repeats the sequence of instructions 156–168. If all of the entries are correct, the processor exits at 100.

The signal bits of the EOD pointers, in order to accurately mark the boundaries of the stored data frames, are set to a common logic state. This state must be different from that of the adjacent stored data signal units. This contains the data content of the frame signal units to signal bit patterns which do not include the common logic state bit pattern of the pointers.

The present data storage method provides a major improvement in the reliability and integrity of the stored data content. It accounts for interruptions of power during write-in as well as existing memory failures. It does this by providing EOD markers to identify the most recent frame and by reading each frame following write-in to verify the signal storage capability of each address location. Loss of data due to power interrupt is limited to the last real time frame. Failure of memory location is protected by marking the failure to prevent future use and rewriting the data to new locations. The write-in process is not complete until all of the stored frame data is verified, so that the initial stored data integrity is guaranteed.

The effects of long term memory which cause loss of data accuracy are guarded against by using an error checking code embedded in each stored frame. While nothing can prevent the loss of the data, the use of the error checking procedure protects against the use of the inaccurate data in reconstructing the data's real time waveform. This results in further enhancement of reconstruction accuracy.

Although the invention has been shown and described with respect to a best mode embodiment thereof, it should be understood by those skilled in the art that the foregoing and various other changes, omissions, and additions in the form and detail thereof may be made therein without departing from the spirit and scope of the invention.

What is claimed is:

1. The method of storing serial bit data signal units in electronic memory, comprising the steps of:

arranging the data signal units in successive frames, serially, from a data signal unit to a last data signal unit in each frame;

adding first and second pointer signal units following said last data signal unit in each frame, said first pointer and second pointer signal units and said data signal units each having a plurality of signal bits; and storing the frames at successive memory address locations in electronic memory, by first storing said second pointer signal unit of a present frame to a first address location furthest from a preceding stored frame, and proceeding serially backwards with the data signal units until said first data signal unit of the present frame is stored at the address location of said second pointer signal unit of said preceding stored frame to replace said second pointer signal unit of said preceding stored frame, whereby said present frame is stored with said first and second pointer signal units and said preceding stored frames are stored with said first pointer signal unit.

2. The method of claim 1, wherein said step of adding further comprises the step of:

setting the signal bits of said first and second pointer signal units to a common logic state which is different from that allowed to occur for said data signal units.

3. The method of claim 1, wherein the step of storing comprises the steps of:

buffering each stored frame in a signal buffer;

comparing each data signal unit of each stored frame in memory with the corresponding data signal unit in said signal buffer;

identifying each address location of each data signal unit having a data content different from that of its corresponding signal unit in said buffer, as a failed address location;

extending said first address location to a next succeeding location which is further from said first address location by a number of address locations equal to the number of said failed address locations;

rewriting said stored frame to memory in sequence after skipping over said failed address locations.

4. The method of claim 1, further comprising, prior to said step of storing, the steps of:

mapping the storage location of each present frame in memory to determine a number of successive mapped address locations, beginning with the address location of said second pointer signal unit of said preceding frame, and ending at an address location coincident with said second pointer signal unit of said present frame;

comparing said mapped locations with a tabulation of known failed address locations, to detect any coincidence therebetween; and extending said first address location to a next succeeding address location distant therefrom by the number of said detected failed address locations, wherein said present frame is stored in sequence after skipping over said failed address locations.

5. The method of claim 1, further comprising, prior to said step of storing, the step of:

adding as said last signal unit in each present frame to be stored in memory, an error checking code signal unit for use in determining the data accuracy of each stored frame following retrieval thereof from the memory.

* * * * *